United States Patent
Kryglowski et al.

(10) Patent No.: US 7,032,564 B1
(45) Date of Patent: Apr. 25, 2006

(54) ELECTRO-HYDRAULIC VALVE DEACTIVATION IN AN ENGINE, MANIFOLD ASSEMBLY THEREFOR AND METHOD OF MAKING SAME

(75) Inventors: Nathan W. Kryglowski, Clawson, MI (US); Kenneth J. Parker, Lake Orion, MI (US); Tae-Kyung Kim, Sterling Heights, MI (US); Kelly M. Newby, Eastpoint, MI (US)

(73) Assignee: Gaton Corporation, Cleveland, OH (US)

( * ) Notice: Subject to any disclaimer, the term of this patent is extended or adjusted under 35 U.S.C. 154(b) by 0 days.

(21) Appl. No.: 11/021,454

(22) Filed: Dec. 22, 2004

(51) Int. Cl.
*F02D 13/06* (2006.01)
(52) U.S. Cl. .................... 123/198 F; 123/90.16
(58) Field of Classification Search ............ 123/198 F, 123/90.12, 90.13, 90.16, 90.38
See application file for complete search history.

(56) References Cited

U.S. PATENT DOCUMENTS

| | | | | |
|---|---|---|---|---|
| 6,568,360 B1* | 5/2003 | Cristiani et al. | ......... | 123/90.12 |
| 6,591,796 B1* | 7/2003 | Scott | ....................... | 123/90.13 |
| 6,644,265 B1* | 11/2003 | Parker et al. | ............ | 123/198 F |
| 6,817,325 B1* | 11/2004 | Dinkel et al. | ............ | 123/90.13 |
| 6,904,895 B1* | 6/2005 | Moreno | ....................... | 123/470 |
| 2003/0089322 A1* | 5/2003 | Dinkel et al. | ............ | 123/90.13 |
| 2003/0226527 A1* | 12/2003 | Herbert | ................... | 123/90.13 |
| 2004/0244742 A1* | 12/2004 | Chang | ..................... | 123/90.13 |

* cited by examiner

*Primary Examiner*—Henry C. Yuen
*Assistant Examiner*—Jason Benton
(74) *Attorney, Agent, or Firm*—Anna M. Shih; Roger A. Johnston

(57) ABSTRACT

An electro-hydraulic manifold assembly for deactivation of the valves of one bank of cylinders in a V-10 engine. One solenoid valve controls flow of oil to the hydraulic valve lifter/lash adjuster of a single or first cylinder, a second valve controls flow of oil to the lifters/lash adjusters of cylinders two and five and a third valve controls oil flow to the lifters/lash adjusters for cylinders two and three by taking advantage of the common base circle position of the cams for the paired cylinders.

28 Claims, 3 Drawing Sheets

ELECTRO-HYDRAULIC VALVE DEACTIVATION IN AN ENGINE, MANIFOLD ASSEMBLY THEREFOR AND METHOD OF MAKING SAME

BACKGROUND OF THE INVENTION

The present invention relates to devices for effecting deactivation of the combustion chamber valves of selected cylinders of a multi-cylinder internal combustion engine. In particular, the invention relates to deactivating the cylinders in one bank of a V-type engine with at least five cylinders in the bank.

Systems for electrically controlling the deactivation of the valves of selected cylinders in an engine are known as, for example, the system shown in U.S. Pat. No. 6,644,265, commonly owned by the assignee of the present invention which employs a plurality of solenoid valves disposed on the engine with each valve communicating with the oil supply gallery for the lifters/lash adjusters for the valves of one cylinder. Upon energization and de-energization, the solenoid operated valve either permits or blocks the supply of engine lubricant in the gallery to the hydraulic lifter for effecting deactivation and activation of the valves for the selected cylinder.

Such systems as the aforesaid have required a separate solenoid operated valve for activating and deactivating the valve for each selected cylinder. For example, if it is required to deactivate four cylinders in one bank of an eight cylinder V-type engine then four solenoid operated valves would be required on the cylinder bank. Where it is desired to provide electro-hydraulic valve deactivation of the cylinders in one bank of an engine having more than eight cylinders, the cost of the solenoid operated valves and the attendant manifold hardware associated therewith has become prohibitively costly for high volume production of passenger and light truck engines.

Therefore, it has been desired to provide a way or means of providing electro-hydraulic deactivation of the valves for the cylinders in one bank of a V-type engine having more than four cylinders in the bank and to reduce the number of solenoid operated valves required to effect the valve deactivation and minimize the cost of the valve deactivation system.

BRIEF SUMMARY OF THE INVENTION

The present invention provides electro-hydraulic activation/de-activation for the valves of one bank of cylinders in a multi-cylinder engine such that the valves in a bank of cylinders can be selectively deactivated with fewer solenoid operated valves than the number of cylinders. The manifold assembly of the present invention couples the activation/de-activation of a first pair of cylinders such as the first and fourth cylinders with one solenoid operated valve, a second pair of cylinders such as the second and third cylinders with a second solenoid operated valve and the fifth cylinder with a third solenoid operated valve. This arrangement takes advantage of the common base circle position of the valve actuating cam during the firing cycle for the pairs of cylinders to permit activation/de-activation of the valves for two cylinders at a common time with a single valve. Runners formed in the deckplate valve manifold assembly interconnect the oil distributor channels for the valve lifters/lash adjusters of the paired cylinders to permit one valve to deactivate the valves of two cylinders.

DETAILED DESCRIPTION OF THE INVENTION

Figure 1:
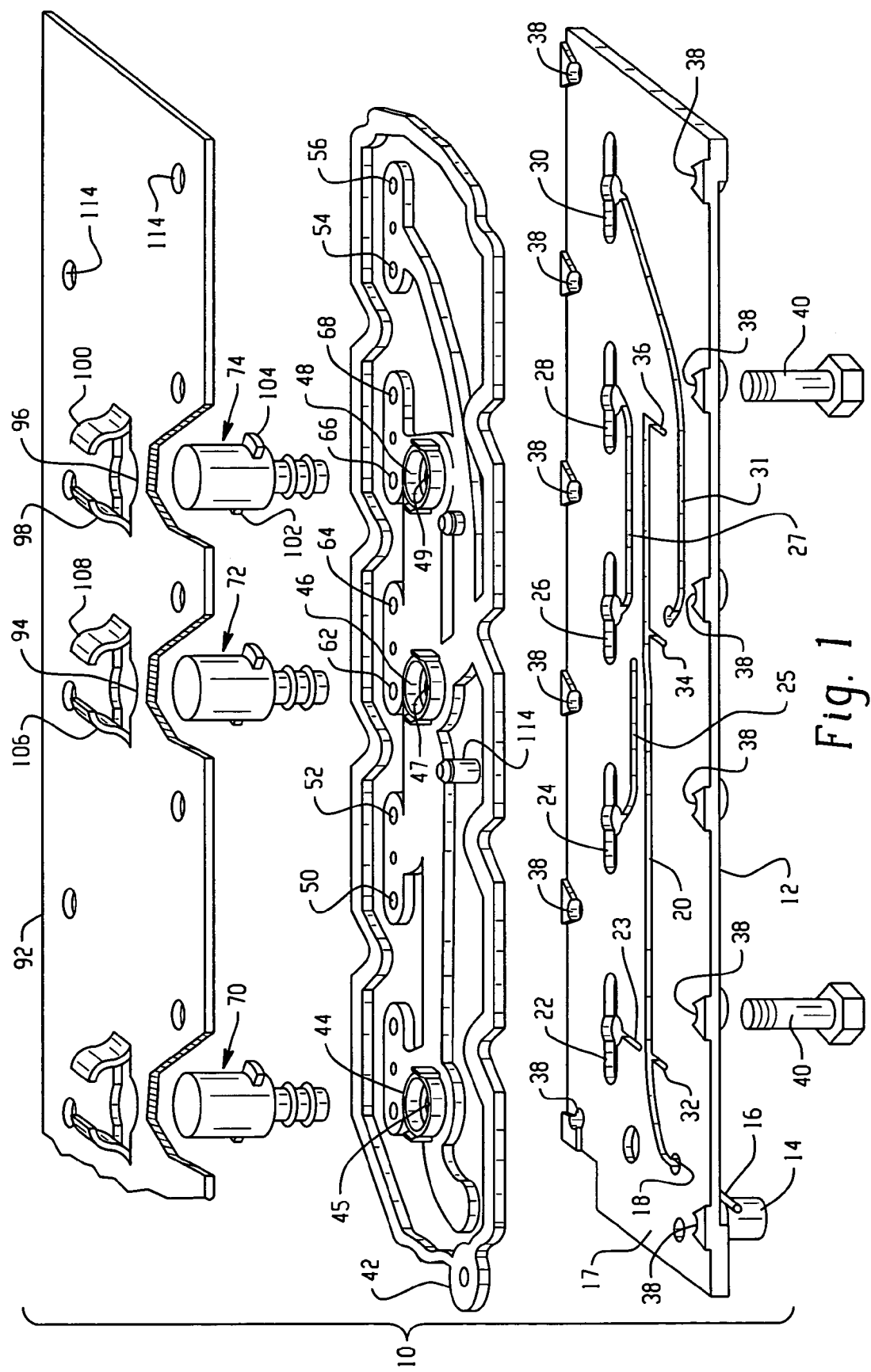
FIG. 1 is an exploded view of an exemplary embodiment of the electro-hydraulic manifold assembly of the present invention in the inverted position.
Figure 2:
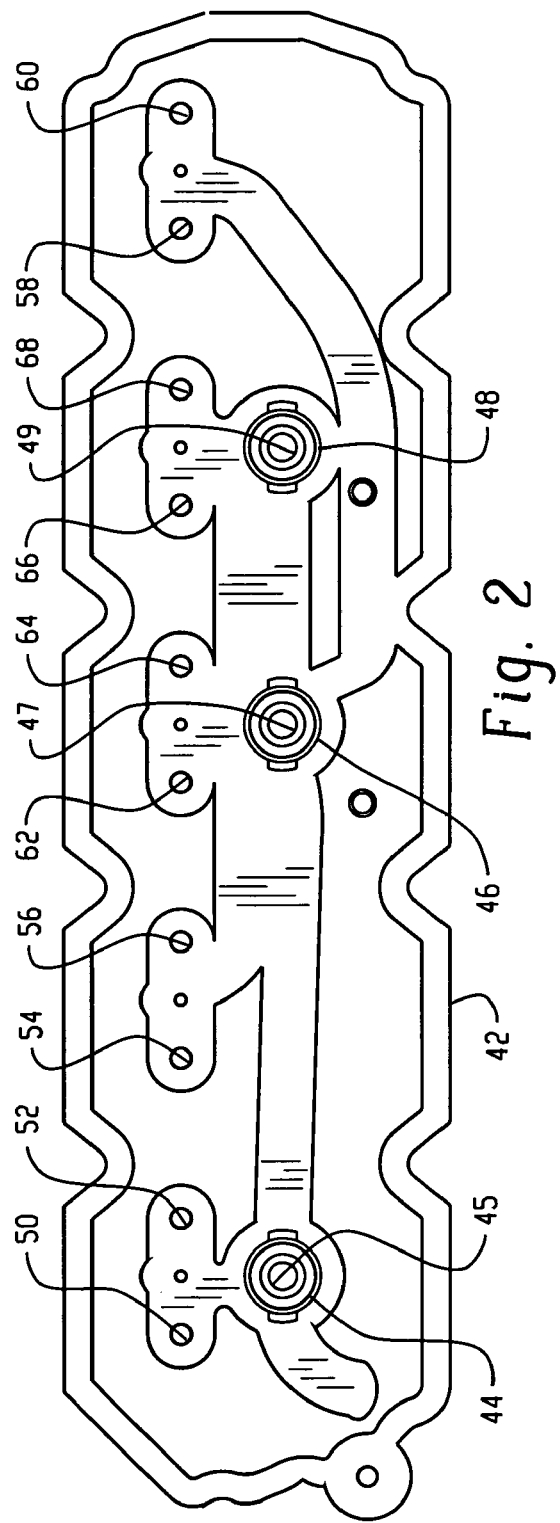
FIG. 2 is a plan view of the valve mounting side of the gasket member of FIG. 1.

Referring to the drawings, the exemplary embodiment of the invention is indicated generally at 10 and which it will be understood is illustrated in the inverted position with respect to installation on an engine block for facilitating illustration of the features of the individual components. The assembly 10 includes a top deckplate 12 having an inlet fitting 14 adapted for connection to a source of pressurized hydraulic fluid such as engine lubricant and which fitting 14 has therein an inlet passage (not shown) which communicates with a transfer conduit 16 which communicates with a supply port 18 formed on the interior face 17 of the deckplate 12. The port 18 communicates with a supply channel or "worm trail" formed along the length of the interior face of the deckplate 12.

The deckplate 12 has a plurality of at least five distributing channels spaced generally equally therealong adjacent the supply channel 20 as indicated by reference numerals 22, 24, 26, 28, 30 in FIG. 1. Distributor channel 22 has a branch 23 which extends therefrom to a position closely adjacent supply channel 20; and, at the same station therealong channel 20 has a station branch 32 extending from the side opposite distributor branch 23.

The distributor channel 24 has an auxiliary channel or runner 25 extending therefrom and along the surface 17 in a direction generally parallel to supply channel 20 and terminates at a station therealong generally coincident with a second side branch 34 of channel 20 extending from the side opposite thereof from the runner 25. The distributor channel 30, the fifth distributor channel, also has a branch or runner 31 which extends along the surface 17 in a leftward direction with respect to FIG. 1 and terminates at a station adjacent the supply branch 34.

The third and fourth distributor branch channels denoted by reference numerals 26, 28 are interconnected by a runner or branch channel 27 extending along surface 17 in a spaced generally parallel arrangement with the supply channel 20. The runner 27 is configured to have a portion thereof based closely adjacent a side branch 36 formed at the end of supply channel 20.

The deckplate 12 has a plurality of mounting holes 38 formed spaced along the sides thereof and which each have received therethrough a suitable fastener such as a bolt; however, for clarity of illustration only two of three are shown in FIG. 1, denoted by reference numeral 40, for attaching the assembly to an engine block as will hereinafter be described.

Figure 3:
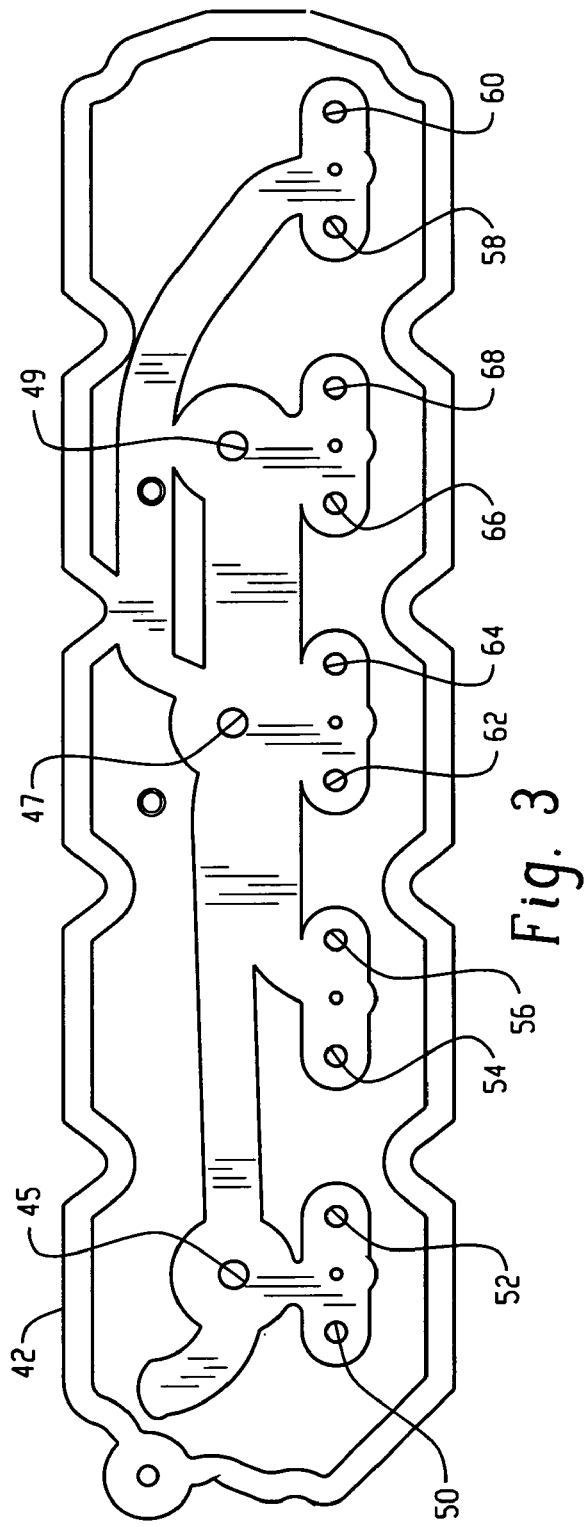
FIG. 3 is a view of the side opposite the valve mounts for the gasket of FIG. 2; and, FIG. 4 is a cross-section taken through one of the valves of the embodiment of FIG. 1 in the assembled condition.

Referring to FIGS. 1 and 3, a valve mounting member/gasket formed of non-metallic material such as, for example, polyamide material or polyamide material fractionally filled with glass particles, is formed to generally conform to the outline of the deckplate 12 and to cover the various channels on the deckplate face 17.

The gasket 42 has three valve mounting bosses formed integrally therewith and spaced therealong as denoted by reference numerals 44, 46, 48 with the valve boss 44 located so as to have its inlet opening 45 located coincident with the supply branch 32. The valve boss 45 has an outlet port formed therein (not shown) but which it will be understood communicates with distributor branch 23 and channel 22.

The gasket 42 has a pair of oil feed holes 50, 52 formed therein which are located thereon so as to communicate with and receive oil from the collector channel 22 for, upon mounting of the assembly 10 to an engine, supplying pressurized engine lubricant to the lifters/lash adjusters (not shown) of a first end cylinder in the cylinder bank of the engine.

The second valve mounting boss 46 is located along the gasket 42 such that the inlet port 47 thereof communicates with the supply channel branch 34 on the deckplate 12 and receives a supply of pressurized engine lubricant therethrough.

The valve boss 46 has formed therein an outlet passage (not shown) which communicates with the runner 25 and the runner 31 in the deckplate for providing a supply of oil to distributor channels 24 and 30 which are located so as to communicate with and supply respectively oil to feed holes 54, 56 and 58, 60 which are located on the gasket to coincide with ports communicating with the lash adjuster valve lifters/lash adjusters respectively cylinders number 2 and 5 of the cylinder bank on the engine cylinder bank to which the assembly is to be attached.

The third valve mounting boss 48 has formed therein a fluid pressure inlet 49 which is located on gasket 42 so as to coincide with the location of the supply channel branch 36 on the deckplate for receiving a supply of pressurized engine lubricant therethrough. The valve boss 48 also has an outlet passage (not shown) which communicates with the runner 27 formed on the deckplate for providing a supply of pressurized engine lubricant to the distributor channels 26 and 28. The gasket 12 has feed holes 62, 64 formed thereon for communicating with the branch channel 26 in the deckplate for supplying a supply of pressurized engine lubricant to the valve lifters/lash adjusters of cylinder number 3 on the cylinder bank of the engine to which the assembly is attached.

The gasket 42 also has a pair of oil feed holes therethrough 66, 68 which are located on the gasket so as to communicate with the branch channel 28 on the deckplate and provide a supply of pressurized engine oil to the valve lifters of cylinder number 4 on the bank of cylinders of the engine to which the assembly is attached.

It will be understood that the pairing of the cylinders for deactivation by a common valve is determined by the commonality of the engine camshaft having the lifting lobes on base circle with respect to cam followers in order to effect valve lifter/lash adjuster deactuation at the same time for two cylinders. Thus the pairing may be different than that of the illustrated embodiment depending on the engine firing order, particularly for a V-type engine with more than ten cylinders.

Figure 4:
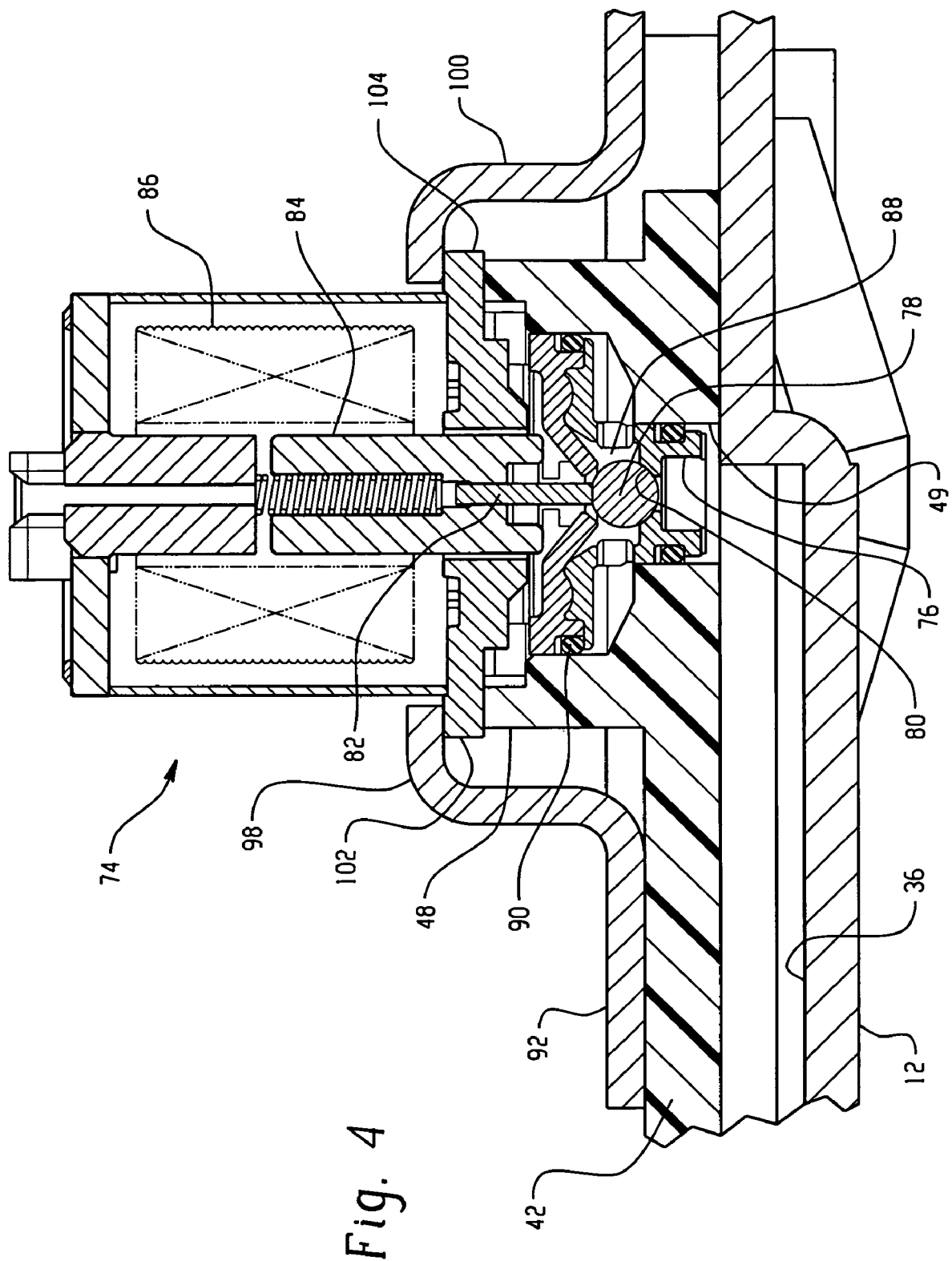

Each of the valve bosses 44, 46, 48 has received therein a solenoid operated valve denoted respectively 70, 72, 74 with the inlets thereof communicating with the inlet ports respectively 45, 47, 49. Referring to FIG. 4, a typical valve installation in the assembly 10 is shown for valve 74 in valve mounting boss 48 wherein the inlet 76 of the valve communicates with supply channel branch 36 in the deckplate through the inlet hole 49 formed in the gasket. The valve has a moveable valve member in the form of a ball 78 which is moveable with respect to a valve seat 80 by an operating rod 82 connected to the moveable armature 84. Upon energization coil 86 moves armature 84 upward to permit the ball 78 to move from the seat 80 and thus allows flow across the valve seat 80 to an outlet passage 88 which communicates with an unshown outlet passage in the boss 48 for providing flow of engine lubricant to distributor runner 27. The valve is sealed in the boss by an O-ring seal 90.

Referring to FIGS. 1 and 4, a retaining bracket 92, preferably formed of metal, has a plurality of valve clearance apertures formed therein, two of which are denoted by reference numerals 94, 96 and which are located on the bracket so as to be received over respectively valves 72, 74 upon assembly.

The bracket 92 has formed thereon adjacent valve aperture 96 a pair of retaining lugs 98, 100 which are configured so as to bear against the mounting lugs 102, 104 provided on the valve 74 for retaining the valve in the mounting boss 48.

Similarly, the bracket 42 has formed thereon adjacent valve aperture 94 a pair of lugs 106, 108 which are configured to bear against the projections 110, 112 provided on valve 72 for retaining the valve in mounting boss 46.

The bracket 92 may be located on the gasket 42 and retained thereon by suitable fasteners such as screws 118 received through holes 116 and engaging blind threaded holes 114 on the surface 17 of the deckplate.

The present invention thus provides a simple to manufacture and install, yet relatively low cost assembly for attachment to the cylinder bank of an engine having at least five cylinders in the bank with one electro-hydraulic valve provided for actuating and de-actuating the valves in a first cylinder of the bank, a second solenoid operated valve disposed for actuating and de-actuating the valves of a first pair of cylinders for example cylinders number 2 and 5 of the cylinder bank and a third valve for actuating and de-actuating the valves of a second pair of cylinders such as cylinders number 3 and 4 of the cylinder bank, thereby minimizing the cost of the assembly for performing the desired de-activation of all of the cylinders of the cylinder bank.

Although the invention has hereinabove been described with respect to the illustrated embodiments, it will be understood that the invention is capable of modification and variation and is limited only by the following claims.

What is claimed is:

1. A method of making a valve deactivator for the combustion chamber valves of one bank of cylinders in an engine having hydraulic valve lash adjusters/lifters for the combustion chamber valves comprising:

(a) providing a deck with a supply port and a supply pressure channel communicating therewith on one side of said deck and forming on said one side of the deck a plurality of pressure control channels each spaced adjacent said supply channel and adopted for supplying hydraulic fluid pressure to one of the valve lash adjusters/lifters;

(b) disposing a valve mounting frame formed of non-metallic material on said one side of said deck and forming three valving cavities thereon with each cavity having a supply port communicating with said supply channel in said valving deck and an outlet port and communicating the outlet port of a first of said cavities with a first of said control channels, communicating the outlet port of a second of said cavities with the two other of said control channels and communicating the outlet port of the third of said cavities with two additional of said control channels;

(c) disposing an electrically operated valve in each cavity and communicating an inlet of the valve with the respective supply port of the cavity and communicating an outlet of the valve with the respective outlet port of the cavity; and, (d) retaining the valve respectively in each cavity and said frame on said deck.

2. The method defined in claim 1, wherein said step of forming three valve mounting cavities includes forming three bosses integrally as one piece with the mounting frame.

3. The method defined in claim 1, wherein said step of disposing a valve mounting frame includes forming a stiffener of polyamide material.

4. The method defined in claim 1, wherein the step of disposing a valve mounting frame includes forming a mounting frame of polyamide material fractionally filled with glass particles.

5. The method defined in claim 1, further comprising connecting a common electrical lead frame to the valves.

6. The method defined in claim 1, wherein said step of communicating the outlet port of a first of said cavities includes communicating with the control channel for cylinder number one in the bank, said step of communicating the outlet port of a second of said cavities includes communicating with the control channels for cylinders number two and five in the bank and the step of communicating the outlet port of the third of said cavities includes communicating with the control channel for cylinders number three and four of the bank.

7. The method defined in claim 1, wherein said step of retaining the valve in each cavity includes forming at least one projection on the valve and engaging the projection(s) with corresponding surfaces formed on a retaining member.

8. An electro-hydraulic assembly for de-actuating the combustion chamber valves of one cylinder bank of a V-type engine having at least five cylinders in the bank with hydraulic valve lash adjusters/lifters for the combustion chamber valves comprising:

(a) a deck with a supply port and with a plurality of control ports each adapted for communicating with one of lash adjuster/lifter galleries upon mounting to the block of the engine, the deck having on one side thereof a supply pressure channel communicating with said supply port and a plurality of pressure control channels adapted for supplying hydraulic fluid pressure to one of the lash adjusters/valve lifters;

(b) a valve mounting frame disposed on said one side of said deck, said frame including structure defining three valving cavities thereon with each cavity having a supply port communicating with said supply channel in said deck and an outlet port, with the outlet port of a first of said cavities communicating with the control channel for one cylinder of the bank, with the outlet port of a second of said cavities communicating with the control channel for two other cylinders of said bank and with the outlet port of the third of said cavities communicating with the control channels for the remaining two cylinders of the bank;

(c) an electrically operated valve disposed in each valving cavity with an inlet of the valve communicating with the supply port in the cavity and an outlet of the valve communicating with the outlet port of the cavity; and, (d) structure operable for retaining the valve in each cavity and said frame on said deck.

9. The assembly defined in claim 8, wherein said structure defining said three valving cavities is formed integrally with the mounting frame as a one-piece member.

10. The assembly defined in claim 8, wherein said mounting frame is formed essentially of polyamide material.

11. The assembly defined in claim 10, wherein said polyamide material is fractionally filed with glass particles.

12. The assembly defined in claim 8, wherein said structure operable for retaining the valve includes at least one projection on the valve for engagement in the cavity.

13. The assembly defined in claim 12, wherein said at lease one projection engages said structure in twist locking arrangement.

14. The assembly defined in claim 8, wherein said structure defining said valving cavities includes three bosses formed integrally with the mounting frame.

15. A method of making a valve deactivator for the combustion chamber valves of one bank of cylinders in an engine having hydraulic valve lash adjusters/lifters comprising:

(a) forming a deck having a supply channel and a plurality of pressure control channels communicating therewith, each control channel operable, upon connection to the engine, for communicating with the lash adjuster/lifter for the valves of one cylinder;

(b) disposing a valve mounting frame on one side of said deck and forming three valving chambers thereon with a first of said three chambers communicating with the pressure control channels for the lash adjuster/lifter for the valves of a first pair of said cylinders, a second of said three chambers communicating with the pressure control channels for the lash adjusters/lifters for the valves of a second pair of said cylinders and the third of said three chambers communicating with the lash adjusters/lifters for the valves of a fifth of said cylinders; and, (c) disposing an electrically operated valve in each of said valving chambers and retaining said valves, frame and deck plate as an assembly.

16. The method defined in claim 15, wherein said step of forming a mounting frame includes forming a frame of plastic material.

17. The method defined in claim 16, wherein said step of forming a mounting frame includes fractionally filling the plastic material with glass particles.

18. The method defined in claim 15, wherein said step of retaining said valves in said chamber includes superposing said valves with a bracket.

19. The method defined in claim 18, wherein said step of retaining includes securing said bracket, mounting frame and said deck plate to the engine with fasteners.

20. An electro-hydraulic assembly for de-actuating the combustion chamber valves of an engine having a bank of five cylinders with hydraulic valve lash adjusters/lifters comprising:

(a) a deck with a supply port and with five control ports, each adapted for, upon mounting to the engine, communicating with a supply gallery for the adjuster/lifter for one cylinder;

(b) a valve mounting frame with three valving chambers thereon, each communicating with the supply port, one of said chambers communicating with a first pair of said control ports, a second of said chambers communicating with a second pair of said control ports and the third of said chambers communicating with the fifth of said control ports;

(c) three electrically operated valves, each disposed to communicate with one of said valving chambers; and, (d) means operative for retaining said valves in said chambers and for mounting said mounting frame on said deck.

21. The assembly defined in claim 20, wherein said means for retaining includes a bracket received over said valves.

22. The assembly defined in claim 20, wherein said mounting frame is formed of plastic material.

23. The assembly defined in claim 22, wherein said mounting frame is fractionally filled with glass particles.

24. The assembly defined in claim 20, wherein, upon assembly to the engine, said means operably for retaining, said mounting frame and said deck are secured as an assembly by threaded fasteners.

25. A method of deactivating the combustion chamber valves in one cylinder bank of an engine with hydraulic valve lifters/lash adjusters comprising:

(a) identifying pairs of cylinders which have the camshaft lobes on base circle, with respect to the respective cam followers for the cylinder, at a common time;

(b) disposing an electrically operated valve in the engine and connecting the inlet of the valve to the engine lubricant supply; and, (c) connecting the outlet of the electric valve to supply galleries for the lifters/lash adjusters of said identified pair of cylinders and commonly deactivating said pair of cylinders with said valve.

26. The method defined in claim 25, wherein said step of disposing an electrically operated valve includes disposing a solenoid operated valve.

27. The method defined in claim 25, wherein said step of disposing an electric valve includes disposing said valve for said identified pair of cylinders on a deckplate and forming channels in the deckplate adapted for connection to the lifter/lash adjusters for said pair of cylinders; and, connecting the outlet of said valve to said channels.

28. The method defined in claim 27, further comprising mounting said valve on a non-metallic valve mount/stiffener and mounting said valve mount stiffener on said deckplate.

* * * * *

UNITED STATES PATENT AND TRADEMARK OFFICE
CERTIFICATE OF CORRECTION

| | | |
|---|---|---|
| PATENT NO. | : 7,032,564 B1 | Page 1 of 1 |
| APPLICATION NO. | : 11/021454 | |
| DATED | : April 25, 2006 | |
| INVENTOR(S) | : Nathan W. Kryglowski et al. | |

It is certified that error appears in the above-identified patent and that said Letters Patent is hereby corrected as shown below:

Title Page; in field (73), Assignee, cancel the text "Gaton Corporation, Cleveland, OH (US)" and insert the following text:

--Eaton Corporation, Cleveland, OH (US)--

Signed and Sealed this
Twenty-sixth Day of February, 2013

Teresa Stanek Rea
*Acting Director of the United States Patent and Trademark Office*